(12) United States Patent
Horner et al.

(10) Patent No.: US 9,573,690 B2
(45) Date of Patent: Feb. 21, 2017

(54) THRUST RECOVERY OUTFLOW VALVE WITH A SINGLE BI-FOLD DOOR AND METHOD OF CONTROLLING AIRCRAFT CABIN PRESSURE

(75) Inventors: Darrell Horner, Oro Valley, AZ (US); Andrew Timothy Brown, Scottsdale, AZ (US); Ondrej Dvorak, Tucson, AZ (US); Michael Thomas Dzurak, Litchfield Park, AZ (US); Francisco Adolfo Olea, Tucson, AZ (US); Joseph Daniel Rainey, Tucson, AZ (US); Timur Safen Suleymanov, Tucson, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 820 days.

(21) Appl. No.: 13/225,836

(22) Filed: Sep. 6, 2011

(65) Prior Publication Data

US 2013/0059517 A1   Mar. 7, 2013

(51) Int. Cl.
*B64D 13/02* (2006.01)

(52) U.S. Cl.
CPC .................................... *B64D 13/02* (2013.01)

(58) Field of Classification Search
CPC ...................................................... B64D 13/02
USPC .............................. 454/71; 244/129.5, 129.4
See application file for complete search history.

(56) References Cited

U.S. PATENT DOCUMENTS

| | | | | |
|---|---|---|---|---|
| 3,045,947 A | * | 7/1962 | Bertin et al. | 244/12.1 |
| 3,436,039 A | * | 4/1969 | Emmons et al. | 244/129.5 |
| 3,486,721 A | * | 12/1969 | Myczinski | 244/53 R |
| 3,860,200 A | * | 1/1975 | Petrushka | 244/207 |
| 4,976,466 A | * | 12/1990 | Vauchel | 239/265.29 |
| 5,046,686 A | | 9/1991 | Carla et al. | |
| 5,105,729 A | * | 4/1992 | Signoret et al. | 454/74 |
| 6,273,136 B1 | | 8/2001 | Steinert et al. | |
| 6,352,221 B1 | * | 3/2002 | Sakurai | 244/102 R |
| 6,682,413 B1 | * | 1/2004 | Devitis et al. | 454/156 |
| 7,185,853 B2 | * | 3/2007 | Kelnhofer et al. | 244/129.5 |
| 2004/0149340 A1 | * | 8/2004 | Steinert et al. | 137/601.08 |
| 2010/0210201 A1 | | 8/2010 | Dreisilker et al. | |
| 2010/0216384 A1 | * | 8/2010 | McCarthy et al. | 454/70 |
| 2010/0216385 A1 | * | 8/2010 | Heuer | 454/71 |
| 2010/0240291 A1 | * | 9/2010 | Tanner et al. | 454/72 |
| 2010/0291852 A1 | * | 11/2010 | Steinert et al. | 454/71 |
| 2011/0165828 A1 | * | 7/2011 | Horner et al. | 454/74 |
| 2012/0064813 A1 | * | 3/2012 | Horner et al. | 454/71 |
| 2013/0084791 A1 | * | 4/2013 | Al-Alusi et al. | 454/76 |

* cited by examiner

*Primary Examiner* — Steven B McAllister
*Assistant Examiner* — Samantha Miller
(74) *Attorney, Agent, or Firm* — Lorenz & Kopf, LLP (57) ABSTRACT

A bi-fold valve door and method for controlling aircraft cabin pressure are provided. The bi-fold valve door includes an aft door section and a forward door section, and only the forward door section is selectively rotated about one rotational axis to a position between a closed position and a full-open position, while the aft door section is maintained in its closed position. The forward door section is selectively rotated about the rotational axis to a full-open position to engage the aft door section, while the aft door section is maintained in its closed position. When the forward door section is in the full-open position, the aft door section and the forward door section are simultaneously rotated about another rotational axis.

18 Claims, 4 Drawing Sheets

THRUST RECOVERY OUTFLOW VALVE WITH A SINGLE BI-FOLD DOOR AND METHOD OF CONTROLLING AIRCRAFT CABIN PRESSURE

TECHNICAL FIELD

The present invention generally relates to aircraft cabin pressure thrust recovery systems, and more particularly relates to a cabin pressure thrust recovery outflow valve and a method of controlling aircraft cabin pressure.

BACKGROUND

Aircraft are commonly equipped with Cabin Pressure Control Systems (CPCSs), which maintain cabin air pressure within a desired range to increase passenger comfort during flight. A typical CPCS may include a controller, an actuator, and an outflow valve. The outflow valve is typically mounted either on a bulkhead of the aircraft or on the outer skin surface of the aircraft, and selectively fluidly couples the aircraft cabin and the atmosphere outside of the aircraft. During operation, the controller commands the actuator to move the outflow valve to various positions to control the rate at which pressurized air is transferred between the aircraft cabin and the outside atmosphere, to thereby control the pressure and/or rate of change of pressure within the aircraft cabin. The controller may be configured to command the actuator to modulate the outflow valve in accordance with a predetermined schedule or as a function of one or more operational criteria. For example, the CPCS may additionally include one or more cabin pressure sensors to sense cabin pressure and supply pressure signals representative thereof to the controller. By actively modulating the outflow valve, the controller may maintain aircraft cabin pressure and/or aircraft cabin pressure rate of change within a desired range.

In some aircraft, the outflow valve may be positioned on the aircraft outer skin surface such that, when pressurized air is exhausted from the cabin, the exhausted air may provide additional forward thrust to the aircraft. Thus, outflow valves may sometimes be referred to as thrust recovery valves. Many thrust recovery valves often include two valve doors with multiple actuation linkages to enable proper sealing, reduce drag, and optimize valve door positioning for cruise thrust creation. In order to maximize the thrust produced by two-door thrust recovery valves, the valve doors are shaped and sealed so that air flow is directed between the doors during flight. As a result, the shapes and cross sections of the valve doors can be relatively complex, as can the seal design.

In addition to the above, because of the pressure load the valve doors may experience during flight, the valve doors are typically manufactured to be relatively robust in strength, which can result in them being relatively thick. Also, because of the relatively large aerodynamic loads during flight, the actuation means for driving the valve doors can be relatively complex, heavy, and expensive. Thus, to provide adequate mechanical advantage, relatively large swing arms may need to be manufactured into both doors.

In some instances, two-door thrust recovery valves are configured such that both doors are actuated by a single actuator. With such valves, both doors are linked together using one or more push rods between the swing arms. Because both doors are actuated together, it can be difficult to ensure that drag is not created by the doors during all modes of flight. This is because while air is directed between the doors, the leading and trailing edges of each door may stick out in the air stream.

Finally, because the thrust recovery valve, when opened on the ground, must provide a maximum exhaust path effective area, and because the doors can be relatively thick and employ swing arms that are large to accommodate the aerodynamic torque, the valve doors are typically relatively large in size. This also results in increased valve weight.

Hence, there is a need for a thrust recovery valve that does not rely on relatively complex shapes and seals, and/or does not rely on a relatively large and expensive actuator to move it, and/or does not create unwanted drag during aircraft cruise operations, and/or can be manufactured from relatively light-weight composite materials. The present invention addresses one or more of these needs.

BRIEF SUMMARY

In one embodiment, a thrust recovery outflow valve includes a valve frame and a bi-fold valve element. The valve frame is configured to be mounted on an aircraft exterior skin, and includes an inner surface that defines a flow passage through the valve frame. The bi-fold valve door is mounted within the valve frame and includes an aft door section and a forward door section. The aft door section is rotationally coupled to the valve frame and is rotatable, relative to the valve frame, about a first rotational axis between an aft door closed position and an aft door full-open position. The forward door section is rotationally coupled to the aft door section and is configured to receive a rotational drive torque. The aft door section is rotatable, relative to the valve frame and the aft door section, about a second rotational axis between a forward door closed position and a forward door full-open position. The bi-fold valve door is configured such that, when a positive pressure is applied from the cabin side of the bi-fold valve door, the aft door section is in the aft door closed position whenever the forward door section is not in the forward door full-open position, and when the forward door section is in the forward door full-open position, the forward door section engages the aft door section to selectively transfer rotational drive torque supplied to the forward door section to the aft door section to rotate the aft door section, simultaneously with the forward door section, about the first rotational axis, to thereby rotate the aft door section between the aft door closed position and the aft door full-open position.

In another embodiment, a thrust recovery outflow valve includes a valve frame and a bi-Fold valve door. The valve frame is configured to be mounted on an aircraft exterior skin, and includes an inner surface that defines a flow passage through the valve frame. The bi-fold valve door is mounted within the valve frame and includes an aft door section, a forward door section, a first mechanical stop, and a second mechanical stop. The aft door section has a first size and includes an aft door section leading edge and an aft door section trailing edge. The aft door section is rotationally coupled to the valve frame between the aft door section leading edge and the aft door section trailing edge and is rotatable, relative to the valve frame, about a first rotational axis between an aft door closed position and an aft door full-open position. The forward door section has a second size that is less than the first size and includes a forward door section leading edge and a forward door section trailing edge. The forward door section trailing edge is disposed adjacent to, and is rotationally coupled to, the aft door section leading edge. The forward door section is configured to receive a rotational drive torque and is rotatable, relative to the valve frame and the aft door section, about a second rotational axis between a forward door closed position and a forward door full-open position. The first mechanical stop is coupled to and extends from the forward door section, and is disposed adjacent the forward door section trailing edge. The second mechanical stop is coupled to and extends from the aft door section, and is disposed adjacent the aft door section leading edge. The bi-fold valve door is configured such that, when a positive pressure is applied from the cabin side of the bi-fold valve door, the aft door section is in the aft door closed position whenever the forward door section is not in the forward door full-open position, and when the forward door section is in the forward door full-open position, the first mechanical stop engages the second mechanical stop to selectively transfer rotational drive torque supplied to the forward door section to the aft door section to thereby rotate the aft door section, simultaneously with the forward door section, between the aft door closed position and the aft door full-open position.

In yet another embodiment, a method of controlling pressure in a cabin of an aircraft that comprises a bi-fold valve door mounted in a valve frame that defines a flow passage between the cabin and atmosphere outside of the aircraft. The bi-fold valve door including an aft door section and a forward door section, the aft door section rotationally coupled to the valve frame and selectively rotatable, relative to the valve frame, about a first rotational axis between an aft door closed position and an aft door full-open position, the forward door section rotationally coupled to the aft door section and selectively rotatable, relative to the valve frame and the aft door section, about a second rotational axis between a forward door closed position and a forward door full-open position. Only the forward door section is selectively rotated about the second rotational axis to a position between the forward door closed position and the forward door full-open position, while the aft door section is maintained in the aft door closed position. The forward door section is selectively rotated about the second rotational axis to the forward door full-open position to engage the aft door section, while the aft door section is maintained in the aft door closed position. When the forward door section is in the forward door full-open position, the aft door section and the forward door section are simultaneously rotated about the first rotational axis.

Furthermore, other desirable features and characteristics of the cabin pressure control system thrust recovery outflow valve and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
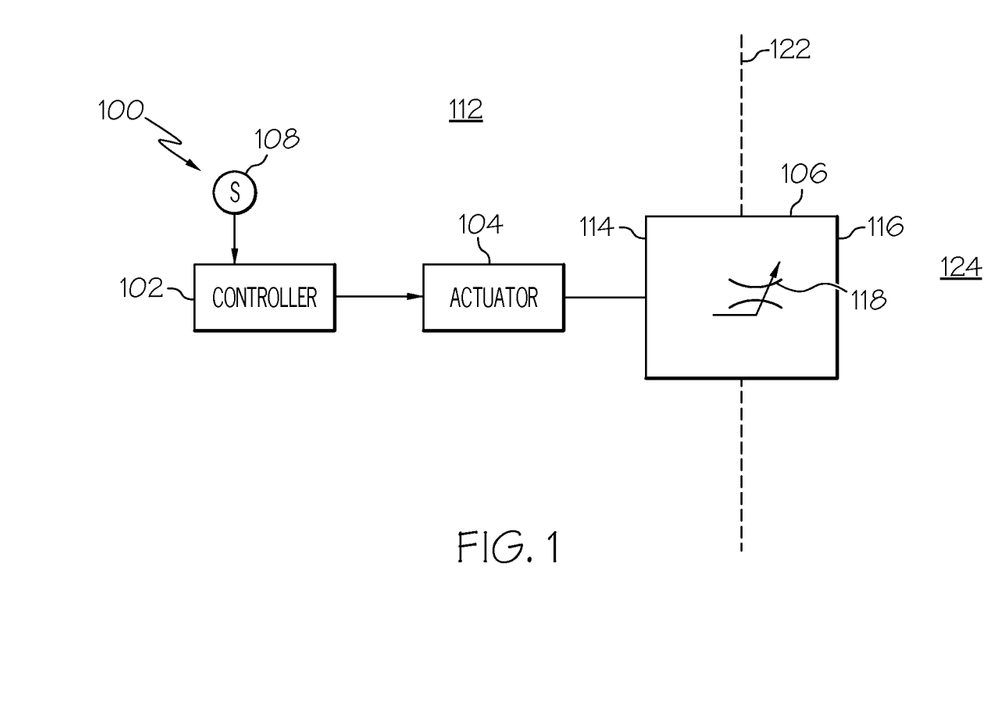
FIG. 1 is a functional block diagram of an exemplary cabin pressure control system (CPCS)

Turning first to FIG. 1, a simplified block diagram of an exemplary aircraft cabin pressure control system (CPCS) 100 is depicted. In the depicted embodiment, the CPCS 100 includes a controller 102, an actuator 104, and a thrust recovery outflow valve 106. The controller 102 is operatively (e.g., electrically) coupled to the actuator 104, which is, in turn, mechanically coupled to the thrust recovery outflow valve 106. During operation of the CPCS 100, the controller 102 commands the actuator 104 to move the thrust recovery outflow valve 106 to various positions, to thereby modulate cabin pressure and/or cabin pressure rate-of-change.

It will be appreciated that the controller 102 may command the actuator 104 to move the thrust recovery outflow valve 106 in accordance with a predetermined schedule or as a function of one or more sensed parameters. In the depicted embodiment, the CPCS 100 further includes one or more cabin pressure sensors 108 (only one shown for clarity) that sense pressure within the aircraft cabin 112 and supply a cabin pressure sensor signal representative thereof to the controller 102. It will additionally be appreciated that the CPCS 100 may be implemented with various other sensors, such as one or more non-illustrated cabin temperature sensors, one or more non-illustrated cabin-to-atmosphere differential pressure sensors, one or more non-illustrated atmospheric pressure sensors, and one or more outflow valve position sensors, just to name a few.

The thrust recovery outflow valve 106 includes an inlet flow port 114, an outlet flow port 116, and an interposed valve 118. The thrust recovery outflow valve 106 is, for example, preferably mounted on the aircraft exterior skin 122 such that the inlet flow port 114 is exposed to the aircraft cabin 112 and the outlet flow port 116 is exposed to the atmosphere outside of the aircraft 124. Thus, during flight, the pressure in the aircraft cabin 112 (e.g., cabin altitude) and/or the rate of change of aircraft cabin altitude, can be controlled by positioning the valve element 118, via the actuator 104. In one specific implementation, the thrust recovery outflow valve 106 is located in the rear underbelly of the aircraft proximate the tail. Moreover, in some implementations, the thrust recovery outflow valve 106 may be positioned so that additional forward thrust is supplied to the aircraft when pressurized air is venting from the aircraft cabin 112 to the atmosphere 124 outside the aircraft. It will be appreciated that the thrust recovery outflow valve 106 may be variously configured to implement this functionality.

Figure 2:
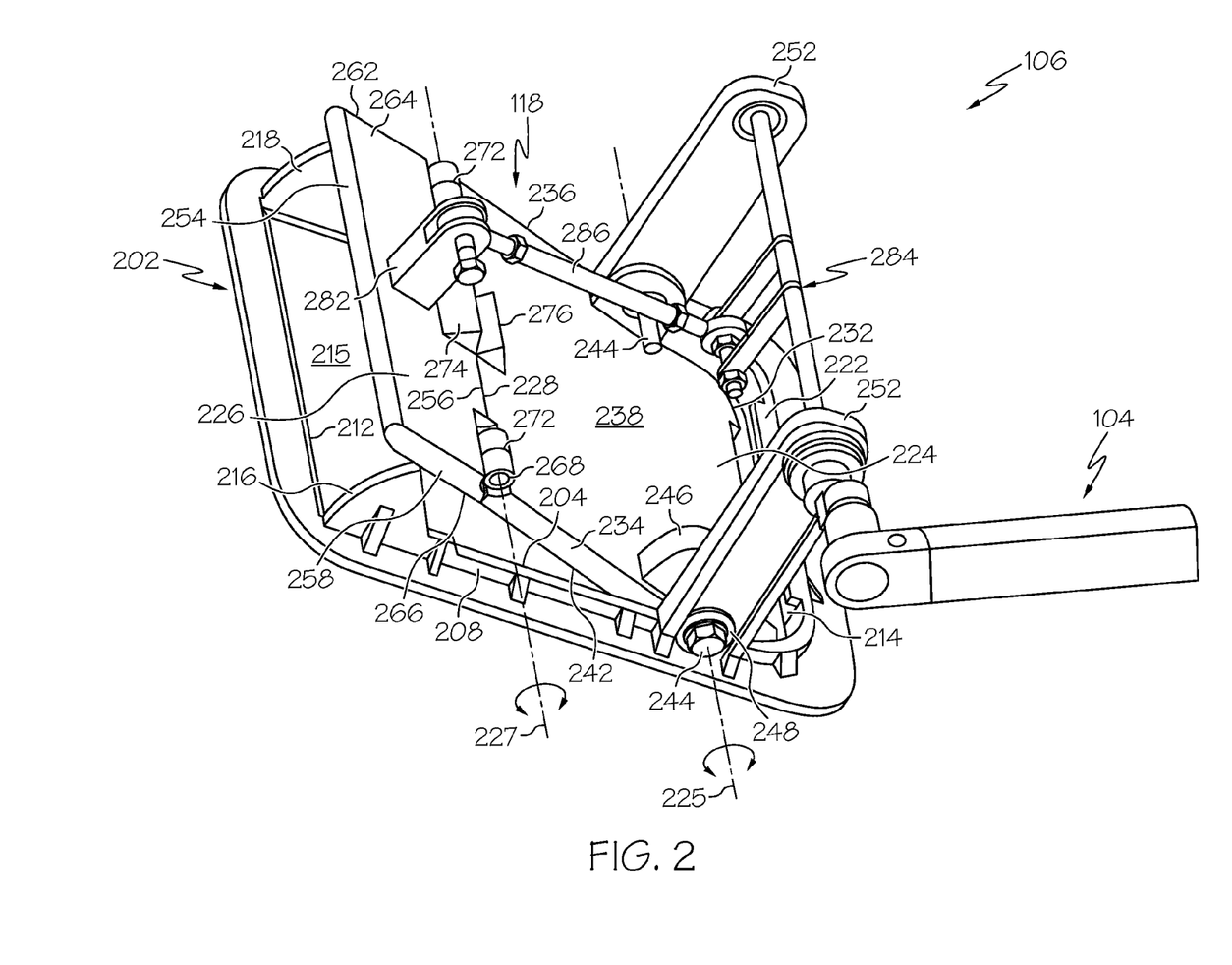
FIG. 2 depicts a perspective plan view of one example embodiment of a thrust recovery outflow valve that may be used in the system of FIG. 1.

One particular physical implementation is depicted in FIG. 2, and with reference thereto will now be described. Before doing so, however, it is noted that, for clarity and ease of illustration, the thrust recovery outflow valve 106 is depicted in FIG. 2 in a non-operational configuration. This will become apparent from the detailed description to follow.

The exemplary physical implementation of the thrust recovery outflow valve 106 includes a valve frame 202, the valve element 118, and the actuator 104. The valve frame 202 is configured to be mounted on the aircraft exterior skin 122, and includes an inner surface 204, an outer surface 208, a forward seat 212, and an aft seat 214. The inner surface 204 defines a flow passage 215 through the valve frame 202 between the inlet flow port 114 and the outlet flow port 116. As FIG. 2 also depicts, the valve frame 202 may additionally include a first side seat 216, a second side seat 218, and an aft door section stop 222. The first and second side seats 216, 218 extend perpendicularly from the valve frame 202 on opposing sides of the forward seat 212, and are disposed parallel to each other. The aft door section stop 222 extends from the valve frame 202 and partially across the flow passage 216. The function of the first and second side seats 216, 218 and the aft door section stop 222 will be described further below. It will be appreciated that the depicted shapes and configurations of the forward seat 212, the aft seat 214, the first and second side seats 216, 218, and the aft door stop 222 are merely exemplary of one embodiment, and that the shapes and configurations thereof may vary.

The valve element 118, which is implemented as a bi-fold valve door, is mounted within the valve frame 202 and includes an aft door section 224 and a forward door section 226. The aft door section 224 and forward door section 226 are implemented and configured to have different relative sizes. In particular, the aft door section 224 has a first size, and the forward door section 226 has a second size that is smaller than the first size. It will be appreciated that the specific and relative sizes of the aft door section 224 and the forward door section 226 may vary. The bi-fold valve door 118 is preferably manufactured from any one of numerous non-metallic composite materials, thereby exhibiting a relatively light weight. It will be appreciated that numerous metallic materials could also be used.

The aft door section is rotationally coupled to the valve frame 202, and includes an aft door section leading edge 228, an aft door section trailing edge 232, an aft door section first side edge 234, an aft door section second side edge 236, an aft door section first side 238, and an aft door section second side 242. Although the manner in which the aft door section 224 is rotationally coupled to the valve frame 202 may vary, in the depicted embodiment the aft door section 224 is rotationally coupled to the valve frame 202 via a plurality of hinges 244. In the depicted embodiment, the hinges 244 are disposed in hinge mounts 246 and in bearing supports 248. The hinge mounts 246 are coupled to, or integrally formed with, the aft door section 224, and the bearing supports 248 are disposed in actuator support mounts 252 that are coupled to, or integrally formed on, the valve frame 202. The hinge mounts 246 are located between the aft door section leading and trailing edges 228, 232, and are preferably disposed slightly closer to the aft door section trailing edge 232. With this location, when a greater pressure is applied to the aft door section first side 238 than to the aft door section second side 242, the aft door section 224 is pressure loaded toward its closed position. As will be described further below, the pressure loading overcomes any opening torque applied by the forward door section 226 until the forward door section 226 is mechanically coupled to the aft door section 224 as depicted in FIGS. 4 and 5.

The forward door section 226 is rotationally coupled to the aft door section 224, and includes a forward door section leading edge 254, a forward door section trailing edge 256, a forward door section first side edge 258, a forward door section second side edge 262, a forward door section first side 264, and a forward door section second side 266. Although the manner in which the forward door section 226 is rotationally coupled to the aft door section 224 may vary, in the depicted embodiment the forward door section 226 is rotationally coupled to the aft door section 226 via a plurality of hinges 268. In the depicted embodiment, the hinges 268 are disposed in hinge mounts 272 that are coupled to, or integrally formed in, the aft door section leading edge 228 and the forward door section trailing edge 256.

Figure 3:
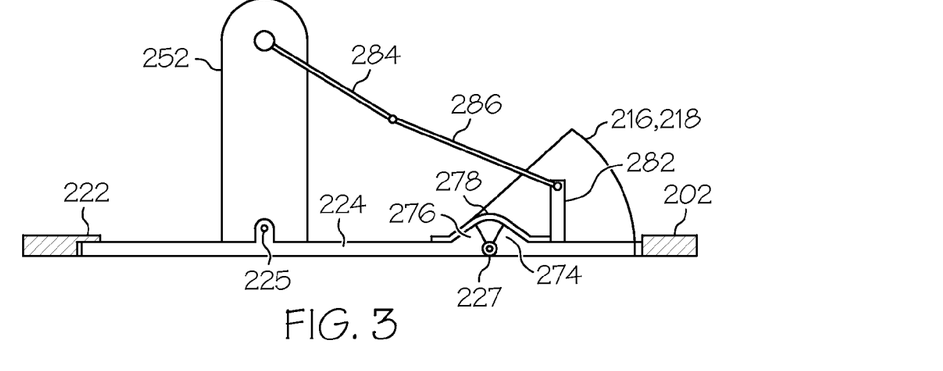
FIGS. 3-5 depict simplified cross section views of the exemplary thrust recovery outflow valve of FIG. 2 in a various valve positions.
Figure 4:
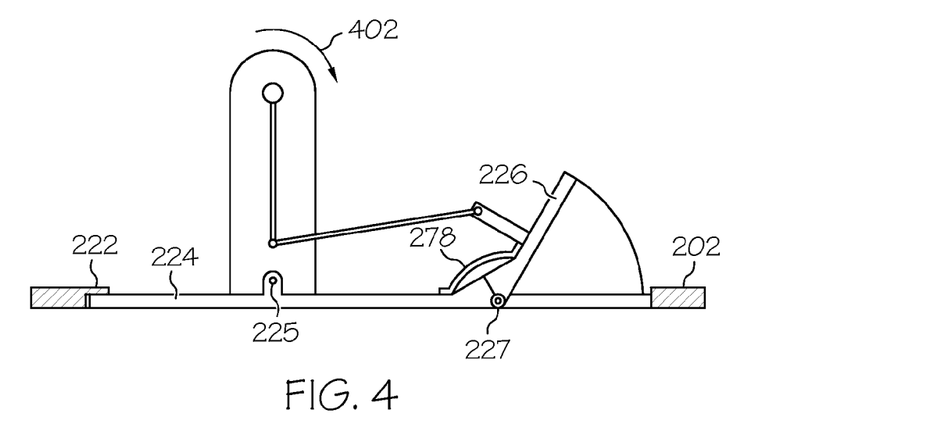
Figure 5:
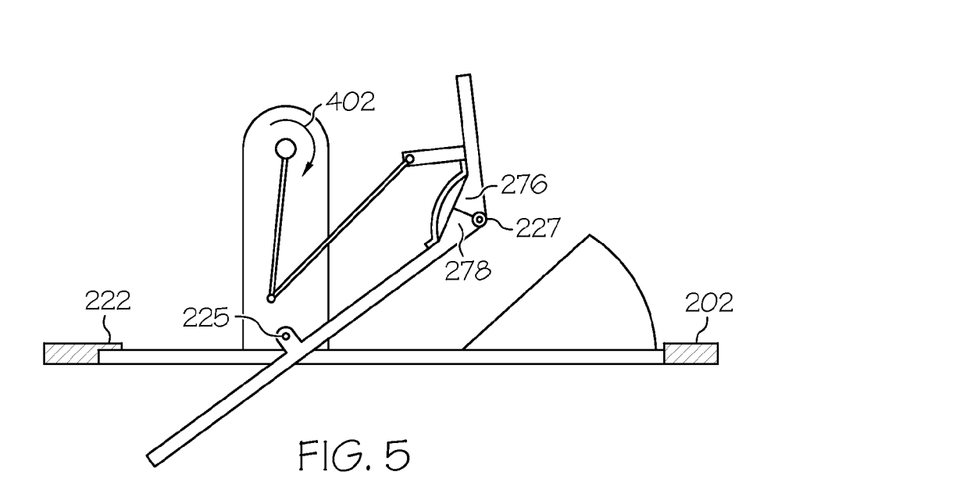

In addition to the above, the bi-fold valve element 118 includes a first mechanical stop 274, a second mechanical stop 276, and a seal 278 (as depicted in FIGS. 3 and 4). The first mechanical stop 274 is coupled to and extends from the forward door section 226, and is disposed adjacent the forward door section trailing edge 256. The second mechanical stop 276 is coupled to and extends from the aft door section 224, and is disposed adjacent the aft door section leading edge 228. The seal 278 is coupled to, and extends across the interface of, the aft door section 224 and the forward door section 226 to prevent leakage between the aft door section leading edge 228 and the forward door section trailing edge 256.

With the above-described configuration, it may be readily appreciated that the aft door section 224 is rotatable about a first rotational axis 225 relative to the valve frame 202, and the forward door section 226 is rotatable about a second rotational axis 227 relative to the valve frame 202 and the aft door section 224. In particular, and as will be described further below, the aft door section 224 is rotatable, relative to the valve frame 202, about the first rotational axis 225 between an aft door closed position, which is the position depicted in FIGS. 3 and 4, and an aft door full-open position, which is the position depicted in FIG. 5. As will also be described further below, the forward door section 226 is rotatable, relative to the valve frame 202 and the aft door section 224, about the second rotational axis 227 between a forward door closed position, which is the position depicted in FIG. 3, and a forward door full-open position, which is the position depicted in FIGS. 4 and 5.

The rotation of the aft and forward door sections 224, 226 is facilitated via the actuator 104, which is configured to supply a rotational drive torque to the forward door section 226. Although the specific configuration and implementation of the actuator 104 may vary, in the depicted embodiment the actuator 104 is preferably implemented using an electric rotary actuator. The actuator 104 is also preferably coupled to the forward door section 226 via a plurality of links. In the depicted embodiment, this includes a door link 282, a drive link 284, and a coupler link 286. The door link 282 is fixedly coupled to, and extends perpendicular from, the forward door section first side 264. The drive link 284 is rotationally mounted on the actuator support mounts 252, and is coupled to the actuator 104 to receive the rotational drive torque therefrom. The coupler link 286 is coupled between the drive link 284 and the door link 282 to transfer the rotational drive torque from the actuator 104 to the forward valve door 226.

Figure 6:
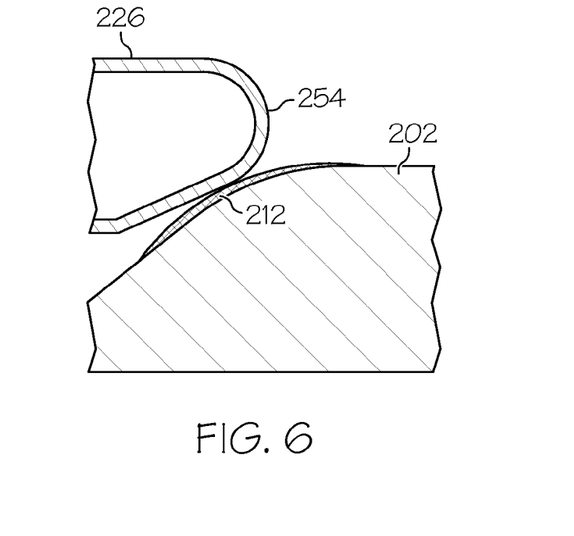
FIG. 6 depicts a close-up cross section view of a portion of the thrust recovery outflow valve of FIG. 2.

With reference now to FIGS. 3-5, operation of the bi-fold valve door 118 will be described. When the bi-fold valve door 118 is in the position depicted in FIG. 3, the aft door section 224 is in the aft door closed position, and the forward door section 226 is in the forward door closed position. It is noted that in some embodiments, as shown most clearly in FIG. 6, the forward door leading edge 254 may be configured to have a partial bell-mouth cross section shape and the forward seat 212, or at least a portion thereof, may be configured to have a reverse bell-mouth cross section shape. Thus, when the forward door section 226 is in the forward door closed position, the partial bell-mouth cross section shape of the forward door leading edge 254 mates with like shaped portion of the forward seat 212. The bell-mouth cross section shapes, if included, are preferably configured to achieve a converging-diverging nozzle, and thereby condition fluid flow to optimize thrust and reduce flow noise, when the forward door section 226 is in an open position.

Referring now to FIG. 4, upon receiving a rotational drive torque from the actuator 104 in a first rotational direction 402, the forward door section 226 may be rotated, about the second rotational axis 227, out of the forward door closed position and toward the forward door full-open position. As FIG. 4 also depicts, the forward door section 226 may be rotated to a plurality of positions between the forward door closed position and the forward door full-open position while, at the same time, the aft door section 224 remains in the aft door closed position. This allows the forward door section 226 to be rotated to any one of numerous partial-open positions (or to the forward door full-open position) during flight operations without creating unwanted drag. It should be noted that during flight operations a differential pressure across the aft door section 224 urges the aft door section 224 into the aft door closed position.

Before proceeding further, it should additionally be noted that when the forward door section 226 is in (or between) the forward door closed position and the forward door full-open position, and the aft door section 224 is simultaneously in the aft door closed position, the forward door section 226 engages the first and second side seats 216, 218 to direct the air into its greatest thrust producing path between the frame 202 forward seat 212 and the forward door leading edge 254. To this end, one or more non-depicted seals may be disposed in the forward door section first and second side edges 258, 262. It should be further noted that the aft door section 224 engages the aft door section stop 222 when the aft door section 224 is in the aft door closed position. The aft door section stop 222 prevents the aft door section 224 from rotating beyond the aft door 224 closed position during flight operations when a differential pressure across the aft door section 224 urges the aft door section 224 into the aft door closed position.

Turning now to FIG. 5, if rotational drive torque in the first direction 402 is supplied to the forward door section 226 when it is in the forward door section full-open position, the forward door section 226 engages the aft door section 224. More specifically, the first mechanical stop 276 engages the second mechanical stop 274. As a result, the rotational drive torque being supplied to the forward door section 226 by the actuator 104 is transferred to the aft door section 224, which causes the aft door section 224 to rotate about the first rotational axis 225 from the aft door closed position to the aft door full-open position (or to a partial-open position between the aft door closed and full-open positions). During flight operations, when there is a differential pressure applied across the valve 116, the forward door section 226 is fixedly coupled to the aft door section 224 because of the rotational drive torque applied to the forward door section 226 engaging the first mechanical stop 276 to the second mechanical stop 274, and because of the applied pressure load on the bi-fold valve element 118 causing a tensile, or pulling apart, reaction at the plurality of hinges 268 about the rotational axis 227 where the plurality of hinges prevents separation of the forward door section 226 from the aft door section 224. As may be readily apparent, when the aft door section 224 is rotating about the first rotational axis 225, the forward door section 226 rotates simultaneously therewith about the first rotational axis 225, but does so relative to the valve frame 202 only (and not relative to the aft door section 224).

Figure 7:
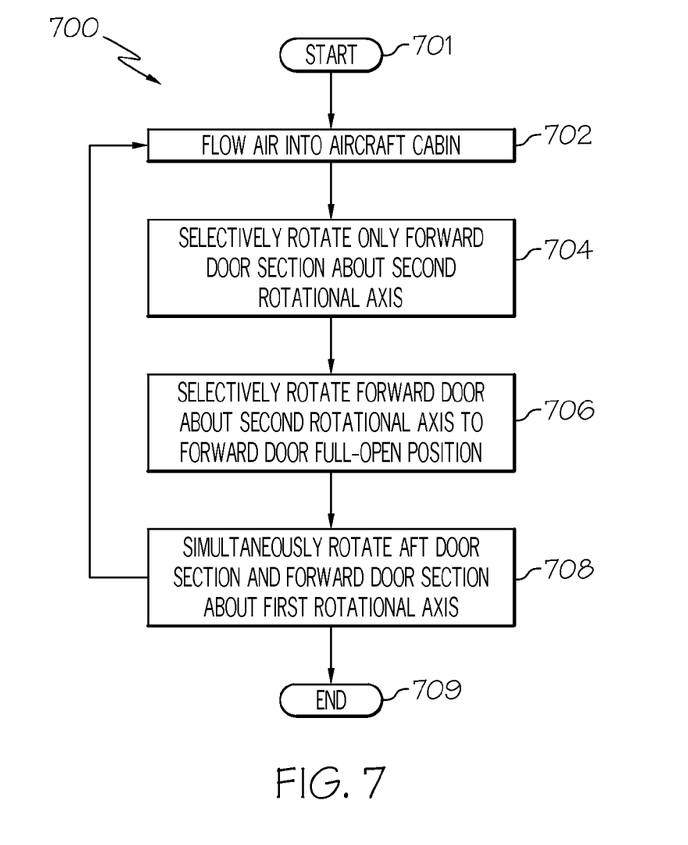
FIG. 7 depicts, in flowchart form, a process that may be implemented by exemplary cabin pressure control system (CPCS) of FIG. 1, when it includes the thrust recovery outflow valve of FIG. 2.

The CPCS 100 depicted in FIG. 1 and described above, when implemented with the thrust recovery valve depicted in FIGS. 2-6 and described above, may implement a process for controlling the pressure in the aircraft cabin 112. The process, which is depicted in flowchart form in FIG. 7, will now be described. The process 700 includes flowing air into the aircraft cabin to produce a differential pressure across the bi-fold valve door 118 (702), and selectively rotating only the forward door section 226 about the second rotational axis 227 to a position between the forward door closed position and the forward door full-open position (704). As noted previously, the differential pressure maintains the aft door section 224 in the aft door closed position when the forward door section 226 is rotated between the forward door closed position and the forward door full-open position. Thereafter, the forward door section 226 may be selectively rotated about the second rotational axis 227 to the forward door full-open position to engage the aft door section (706) and, when the forward door section 226 is in the forward door full-open position, simultaneously rotating the aft door section 224 and the forward door section 226 about the first rotational axis 225 (708). As the skilled artisan may readily appreciate, during aircraft cruise operations, the aft door section 224 is typically kept in the aft door closed position and the position of the forward door section 226 is controlled. The aft door section 224 may be moved to an open position during aircraft ascent, aircraft descent, or aircraft ground operations.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust recovery outflow valve, comprising:
   a valve frame configured to be mounted on an aircraft exterior skin, the valve frame including an inner surface that defines a flow passage through the valve frame; and
   a bi-fold valve door mounted within the valve frame and comprising an aft door section and a forward door section, the aft door section rotationally coupled directly to the valve frame, the aft door section rotatable, relative to the valve frame and about a first rotational axis, between an aft door closed position and an aft door full-open position, the forward door section rotationally coupled directly to the aft door section and configured to receive a rotational drive torque, the forward door section rotatable, relative to the valve frame and the aft door section and about a second rotational axis, between a forward door closed position and a forward door full-open position, the second rotational axis separate from the first rotational axis,
   wherein the aft door section and the forward door section are disposed at identical angles relative to the valve frame when the aft door section is in the aft door closed position and the forward door section is in the forward door closed position, and
   wherein the bi-fold valve door is configured such that when a positive pressure is applied from a cabin side of the bi-fold valve door:
      the aft door section is in the aft door closed position and does not rotate whenever the forward door section is not in the forward door full-open position, and
      when the forward door section is in the forward door full-open position, the forward door section engages the aft door section to selectively transfer rotational drive torque supplied to the forward door section to the aft door section to rotate the aft door section, simultaneously with the forward door section, about the first rotational axis, to thereby rotate the aft door section between the aft door closed position and the aft door full-open position.

2. The valve of claim 1, wherein:
   the aft door section has a first size and the forward door section has a second size that is less than the first size.

3. The valve of claim 1, wherein:
   the aft door section and comprises an aft door section leading edge and an aft door section trailing edge; and
   the aft door section is rotationally coupled directly to the valve frame between the aft door section leading edge and the aft door section trailing edge.

4. The valve of claim 3, wherein:
   the forward door section comprises a forward door section leading edge and a forward door section trailing edge; and
   the forward door section trailing edge is disposed adjacent to, and is rotationally coupled to, the aft door section leading edge.

5. The valve of claim 4, further comprising:
   a first mechanical stop coupled to and extending from the forward door section, the first mechanical stop disposed adjacent the forward door section trailing edge; and
   a second mechanical stop coupled to and extending from the aft door section, the second mechanical stop disposed adjacent the aft door section leading edge, wherein the first mechanical stop engages the second mechanical stop when the forward door section is in the forward door full-open position.

6. The valve of claim 4, further comprising:
a seal coupled to the forward door and the aft door to prevent leakage between the forward door section trailing edge and the aft door section leading edge.

7. The valve of claim 4, wherein the forward door leading edge is configured to have a partial bell-mouth cross section shape.

8. The valve of claim 7, wherein the valve frame further comprises a forward seat, at least a portion of the forward seat configured to have a reversed bell-mouth cross section shape that mates with the partial bell-mouth cross section shape of the forward door leading edge when the forward door section is in the forward door closed position.

9. The valve of claim 8, further comprising:
first and second side seats extending perpendicularly from the valve frame on opposing sides of the forward seat and disposed parallel to each other, the first and second side seats engaged by the forward door section when both (i) the forward door section is in or between the closed and full-open position and (ii) the aft door section is in the aft door closed position.

10. The valve of claim 1, further comprising:
an actuator coupled to the forward door section and configured to supply the rotational drive torque thereto.

11. The valve of claim 10, further comprising:
a door link coupled to and extending from the forward door section, the door link further coupled to receive the rotational drive torque from the actuator;
a drive link coupled to the actuator; and
a coupler link coupled between the drive link and the door link.

12. The valve of claim 1, further comprising:
an aft door section stop extending from the valve frame and partially across the flow passage, the aft door section stop engaging the aft door section when the aft door section is in the aft door closed position.

13. A thrust recovery outflow valve, comprising:
a valve frame configured to be mounted on an aircraft exterior skin, the valve frame including an inner surface that defines a flow passage through the valve frame; and
a bi-fold valve door mounted within the valve frame, the bi-fold valve door comprising:
an aft door section having a first size and including an aft door section leading edge and an aft door section trailing edge, the aft door section rotationally coupled directly to the valve frame between the aft door section leading edge and the aft door section trailing edge, the aft door section rotatable, relative to the valve frame and about a first rotational axis, between an aft door closed position and an aft door full-open position;
a forward door section having a second size that is less than the first size and including a forward door section leading edge and a forward door section trailing edge, the forward door section trailing edge disposed adjacent to, and rotationally coupled directly to, the aft door section leading edge, the forward door section configured to receive a rotational drive torque and rotatable, relative to the valve frame and the aft door section and about a second rotational axis between a forward door closed position and a forward door full-open position, the second rotational axis separate from the first rotational axis;
a first mechanical stop coupled to and extending from the forward door section, the first mechanical stop disposed adjacent the forward door section trailing edge; and
a second mechanical stop coupled to and extending from the aft door section, the second mechanical stop disposed adjacent the aft door section leading edge,
wherein the bi-fold valve door is configured such that when a positive pressure is applied from a cabin side of the bi-fold valve door:
the aft door section is in the aft door closed position and does not rotate whenever the forward door section is not in the forward door full-open position, and
when the forward door section is in the forward door full-open position, the first mechanical stop engages the second mechanical stop to selectively transfer rotational drive torque supplied to the forward door section to the aft door section to thereby rotate the aft door section, simultaneously with the forward door section, between the aft door closed position and the aft door full-open position.

14. The valve of claim 13, further comprising:
a seal coupled to the forward door and the aft door to prevent leakage between the forward door section trailing edge and the aft door section leading edge.

15. The valve of claim 13, wherein:
the forward door leading edge is configured to have a partial bell-mouth cross section shape;
the valve frame further comprises a forward seat; and
at least a portion of the forward seat is configured to have a reversed bell-mouth cross section shape that mates with the partial bell-mouth cross section shape of the forward door leading edge when the forward door section is in the forward door closed position.

16. The valve of claim 15, further comprising:
first and second side seats extending perpendicularly from the valve frame on opposing sides of the forward seat and disposed parallel to each other, the first and second side seats engaged by the forward door section when both (i) the forward door section is in or between the closed and full-open position and (ii) the aft door section is in the aft door closed position.

17. The valve of claim 13, further comprising:
an actuator coupled to the forward door section and configured to supply the rotational drive torque thereto;
a door link coupled to and extending from the forward door section, the door link further coupled to receive the rotational drive torque from the actuator;
a drive link coupled to the actuator; and
a coupler link coupled between the drive link and the door link.

18. The valve of claim 13, further comprising:
an aft door section stop extending from the valve frame and partially across the flow passage, the aft door section stop engaging the aft door section when the aft door section is in the aft door closed position.

* * * * *